United States Patent
Ainsworth et al.

(10) Patent No.: US 9,338,059 B1
(45) Date of Patent: May 10, 2016

(54) SYSTEM AND METHODS FOR MANAGING NETWORKS

(71) Applicant: QLOGIC, Corporation, Aliso Viejo, CA (US)

(72) Inventors: Stephen Ainsworth, Minneapolis, MN (US); Edward C. McGlaughlin, Minneapolis, MN (US); Michael K. Spengler, Minneapolis, MN (US); John P. Wagner, Minnetonka, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 420 days.

(21) Appl. No.: 13/924,107

(22) Filed: Jun. 21, 2013

Related U.S. Application Data (60) Provisional application No. 61/719,180, filed on Oct. 26, 2012.

(51) Int. Cl.
*H04L 12/24* (2006.01)
*H04L 12/54* (2013.01)
*H04L 12/66* (2006.01)

(52) U.S. Cl.
CPC ............ *H04L 41/0889* (2013.01); *H04L 12/56* (2013.01); *H04L 12/66* (2013.01)

(58) Field of Classification Search
None
See application file for complete search history.

(56) References Cited

U.S. PATENT DOCUMENTS

| | | | | |
|---|---|---|---|---|
| 2008/0159260 | A1* | 7/2008 | Vobbilisetty | H04L 69/08 370/351 |
| 2010/0174811 | A1* | 7/2010 | Musiri | G06F 15/173 709/223 |
| 2011/0188511 | A1* | 8/2011 | Di Benedetto | H04L 45/026 370/419 |
| 2011/0299539 | A1* | 12/2011 | Rajagopal | H04L 12/4675 370/395.53 |
| 2014/0003440 | A1* | 1/2014 | Hathorn | H04L 67/1097 370/401 |

* cited by examiner

*Primary Examiner* — Kodzovi Acolatse
(74) *Attorney, Agent, or Firm* — Klein, O'Neill & Singh, LLP (57) ABSTRACT

Method and system for configuring a plurality of virtual networks using a plurality of physical resources of a network device is provided. A hierarchical data structure having a plurality of layers for representing an instance of the network device is generated. A first layer represents the plurality of virtual networks; a second layer represents a plurality of virtual network protocols that are used by the plurality of networks; and a third layer represent the physical resources that are used by the plurality of virtual networks for communicating with other devices. The plurality of virtual networks is validated by using the data structure to check if there is any conflict in using the selected physical resources.

21 Claims, 10 Drawing Sheets

SYSTEM AND METHODS FOR MANAGING NETWORKS

CROSS-REFERENCE TO RELATED APPLICATION

This patent application claims priority under 35 USC §119 (e) to the U.S. Provisional Patent Application, Ser. No. 61/719,180, entitled "System and Methods for Management of Concurrent Virtual Storage and Data Networks," filed on Oct. 26, 2012, the disclosure of which is incorporated herein by reference in its entirety.

TECHNICAL FIELD

The present embodiments relate to networks and network devices.

BACKGROUND

A computer network, often simply referred to as a network, typically includes a group of inter-connected computers and devices that facilitate communication between users, and that allow users to share resources. Adapters, switches and other devices are typically used during network communication. Continuous efforts are being made to improve how network devices are managed and configured.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), or a combination of these implementations. The terms "logic," "module," "component," "system," and "functionality," as used herein, generally represent software, firmware, hardware, or a combination of these elements. For instance, in the case of a software (or firmware) implementation, the terms "logic," "module," "component," "system," and "functionality" represent machine executable code that performs specified tasks when executed on a processing device or devices (e.g., hardware based central processing units). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory computer-readable media. The computer program product may be non-transitory computer storage media, readable by a computer device, and encoding a computer program of instructions for executing a computer process. The computer program product may also be readable by a computing system, and encoding a computer program of instructions for executing a computer process.

Figure 1A:
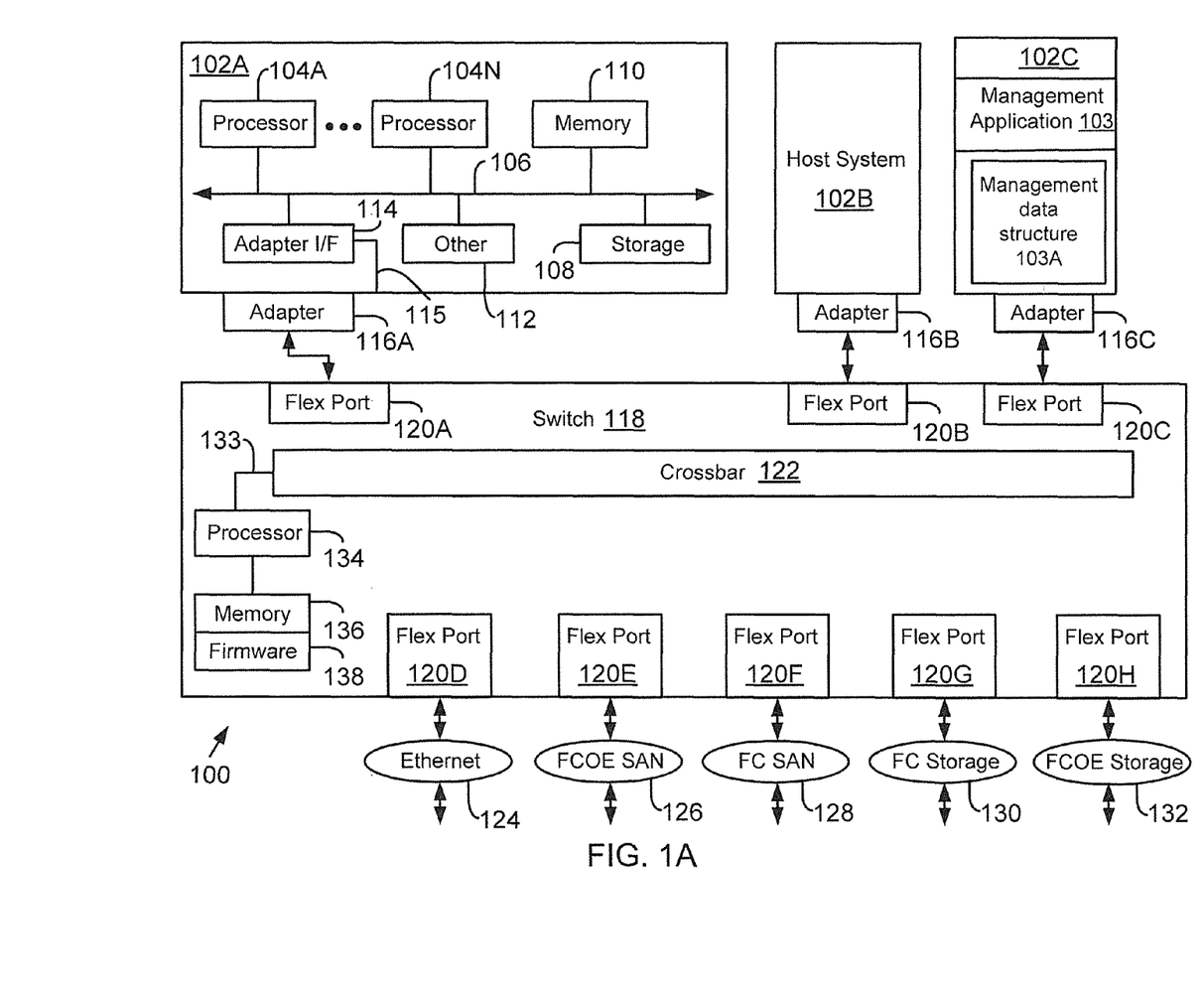
FIG. 1A shows a block diagram of a system using a network device with Flex Ports, according to one embodiment.

System 100:

FIG. 1A is a block diagram of a system 100 for implementing the various embodiments disclosed herein. In one embodiment, system 100 may include a plurality of computing system 102A-102B (may also be referred to as host system 102 or initiator 102) communicating with other devices via adapters 116A-116C (generically referred to as "adapter 116") and a network device, for example, a switch 118 that is described below in more detail, according to one embodiment.

There may be other systems/components that may be placed between the aforementioned components but they are not germane to the embodiments disclosed herein. The embodiments disclosed herein are not limited to any particular number of computing systems, switches or adapters.

System 100 includes a management console 102C, which is similar to host systems 102A-102B. In one embodiment, the management console 102C may execute a management application 103 that uses a management data structure 103A for setting up a network and configuring a plurality of components. Details regarding management console 102C and the data structure 103A are provided below.

Host system 102 may include one or more processors 104A-104N (jointly referred to as processor 104), also known as a central processing unit (CPU), interfacing with other components via an interconnect system (also referred to as a bus) 106. Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Bus 106 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of interconnect.

Host system 102 may also include a local storage device 108, which may be for example a hard disk, a CD-ROM, a non-volatile memory device (flash or memory stick) or any other type of storage device. Storage device 108 may store processor executable instructions and data, for example, operating system program files, application program files, and other files. Some of these files are stored on storage 108 using an installation program. For example, the processor 104 may execute computer-executable process steps of an installation program so that the processor 104 can properly execute the application program.

Host system 102 interfaces with a memory 110 that may include random access main memory (RAM), and/or read only memory (ROM). When executing stored computer-executable process steps from storage device 108, the processor 104 may store and execute the process steps out of memory 110.

Host system 102 may also include other devices and interfaces 112, which may include a display device interface, a keyboard interface, a pointing device interface and others. The details of these devices are not germane to the embodiments disclosed herein.

Host system 102 may also include an adapter interface 114 to interface with adapter 116 via a link 115 that may be a peripheral bus, for example, a PCI, PCI-X or PCI-Express link or any other type of interconnect system. Adapter 116 may be configured to handle both network and storage traffic using various network and storage protocols. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and over a gigabit per second (Gbs or ("G")). The description of the various embodiments described herein is based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage technology used to access storage systems is Fibre Channel (may also be referred to as "FC"). Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port. As an example, adapter 116B may be a Fibre Channel host bus adapter for handling SCSI, FCP and SAN based traffic.

A new and upcoming standard, called Fibre Channel over Ethernet (FCoE) has been developed to handle both Ethernet and Fibre Channel traffic in a storage area network (SAN). This functionality would allow Fibre Channel to leverage 10 Gigabit Ethernet networks while preserving the Fibre Channel protocol. Those of ordinary skill in the art will appreciate, however, that the present embodiments are not limited to any particular protocol or adapter type.

Referring back to FIG. 1A, switch 118 includes a plurality of ports 120A-120H that may also be referred to as "Flex Ports", according to one embodiment. The term Flex Port as used herein means a port having logic and circuitry for sending and receiving information to other devices and ports. A Flex Port is able to perform physical-level packet conversion in a multi-protocol environment, as described below in more detail.

As an example, Flex Port 120A is coupled to adapter 116A of host system 102A, Flex Port 120B is coupled to adapter 116B of host system 102B, and Flex Port 120C is coupled to management console 102C. Flex Port 120D may be coupled to an Ethernet network 124, Flex Port 120E may be coupled to an FCoE Storage Area Network ("SAN") 126, and Flex Port 120F may be coupled to a Fibre Channel SAN 128. Flex Port 120G may be coupled to Fibre Channel storage 130, while Flex Port 120H may be coupled to FCoE storage 132. Flex Ports 120A-120H use crossbar 122 for any inter-port communication. Switch 118 may also include a processor 134 for executing programmable instructions (for example, firmware 138) out of memory 136 for controlling overall switch operations.

In one embodiment, host system 102A uses adapter 116A to send information via an enhanced Ethernet connection. Flex Port 102A receives the information, parses header information, and then determines a route and an egress using the techniques described below. Based on the selected route, a possible egress port may be Flex Port 120D for accessing Ethernet network 124, Flex Port 120E for accessing FCoE SAN 126, Flex Port 120F for accessing Fibre Channel SAN 128, Flex Port 120G for accessing Fibre Channel storage 130, Flex Port 120H for accessing FCoE storage 132, or Flex Port 120B or 120C for sending information to host system 102B or management console 102C, respectively.

In another embodiment, host system 102B may use adapter 116B as a Fibre Channel HBA to send information to Flex Port 120B via a Fibre Channel connection. Flex Port 102B in this case may add an Ethernet header and interpret the header of the Fibre Channel packet to determine a route and an egress port. Based on the route, a possible egress port may be Flex Port 120E for accessing FCoE SAN 126, Flex Port 120F for accessing Fibre Channel SAN 128, Flex Port 120G for accessing Fibre Channel storage 130, and Flex Port 120H for accessing FCoE storage 132.

Figure 1B:
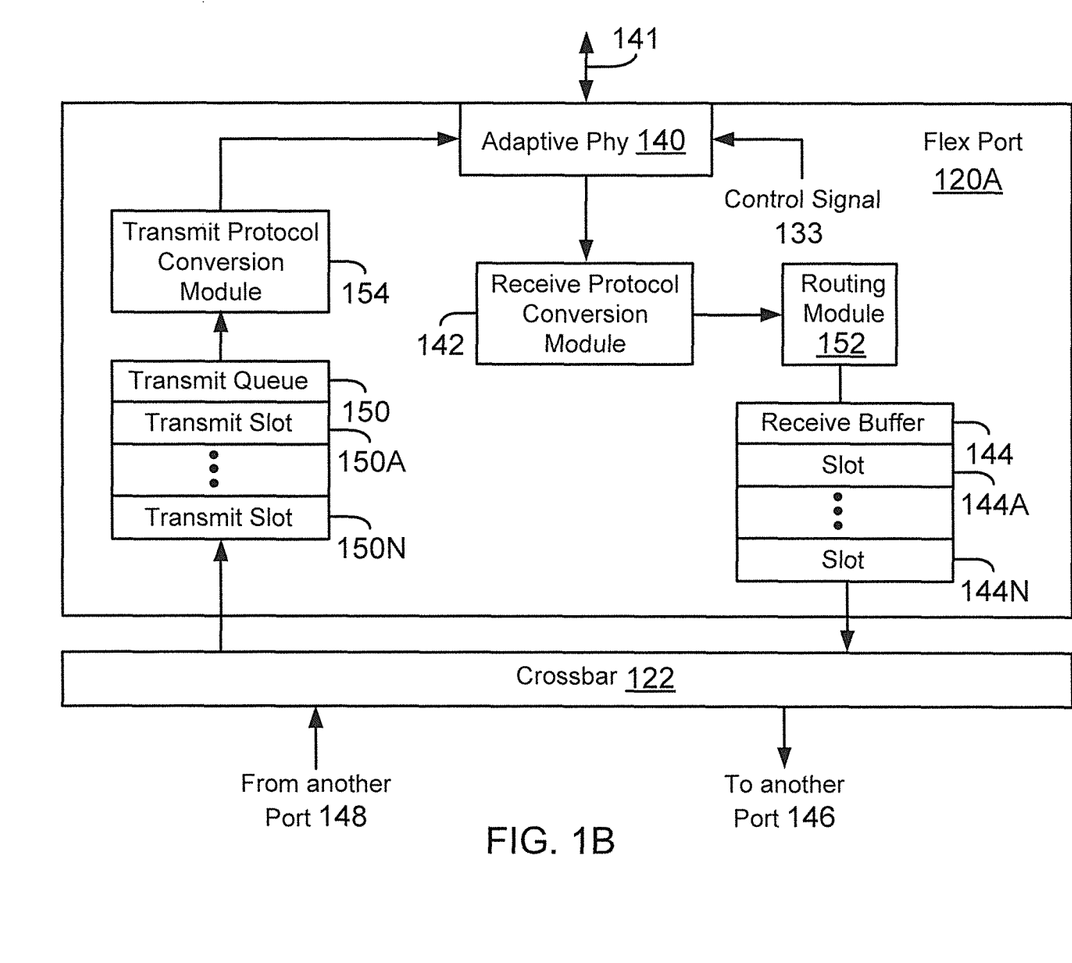
FIG. 1B shows a block diagram of a Flex Port, according to one embodiment.

FIG. 1B shows an example of a Flex Port 120A, according to one embodiment. Flex Port 120A includes an adaptive PHY 140 that can be configured to operate as an Ethernet or Fibre Channel link based on a control signal 133 from processor 134. Adaptive PHY 140 receives packets via link 141 and then forwards the packets to a receive protocol conversion module 142 that operates in an Ethernet pass-through mode or Fibre Channel to Ethernet conversion mode, depending on the control signal 133 from processor 134. In the Ethernet pass through mode, received packets are forwarded without any modification. In the Fibre Channel to Ethernet conversion mode, the received Fibre Channel packets are encapsulated with an Ethernet header, an FCoE prefix header, and Ethernet FCS (Frame Check Sequence).

The received packets are passed to a routing module 152, according to one embodiment. The routing module 152 performs a pattern match based on a stored routing data structure (may also be referred to as a routing table), classifies the packet type and generates a route control tag for the packet.

The routing module 152 then selects a location from among 144A-144N of receive buffer 144 to place the frame. In one embodiment, the receive buffer 144 is a temporary storage device having a plurality of locations for storing outgoing packets.

The routing tag generated by routing module 152 is used to select an egress port from among the various ports of switch 118. Once the port is selected, the frame is routed to the selected port via crossbar 122. In one embodiment, an egress port identifier is used to select the egress port. The received frame may be sent to processor 134, based on the egress port identifier.

Packets from other Flex Ports may be received via path 148 and crossbar 122. The received packets are received and placed at a transmit queue 150 having a plurality of memory storage locations 150A-150N for storing packets. The memory storage locations may also be referred to as memory slots.

Packets from transmit queue 150 are sent to a transmit protocol conversion module 154 that performs an operation depending on its mode of operation. For example, when operating in the Fibre Channel mode, transmit protocol conversion module 154 strips Ethernet encapsulation, if any, and sends out a Fibre Channel frame via adaptive PHY 140 and link 141.

When operating in an Ethernet mode, the transmit conversion module 154 updates a source and/or destination MAC (media access control) address, and recalculates Ethernet FCS. The conversion is based on a transmit translation identifier that is included in the route control tag, which is then removed from the outgoing packets prior to transmission via adaptive PHY 140.

Figure 2A:
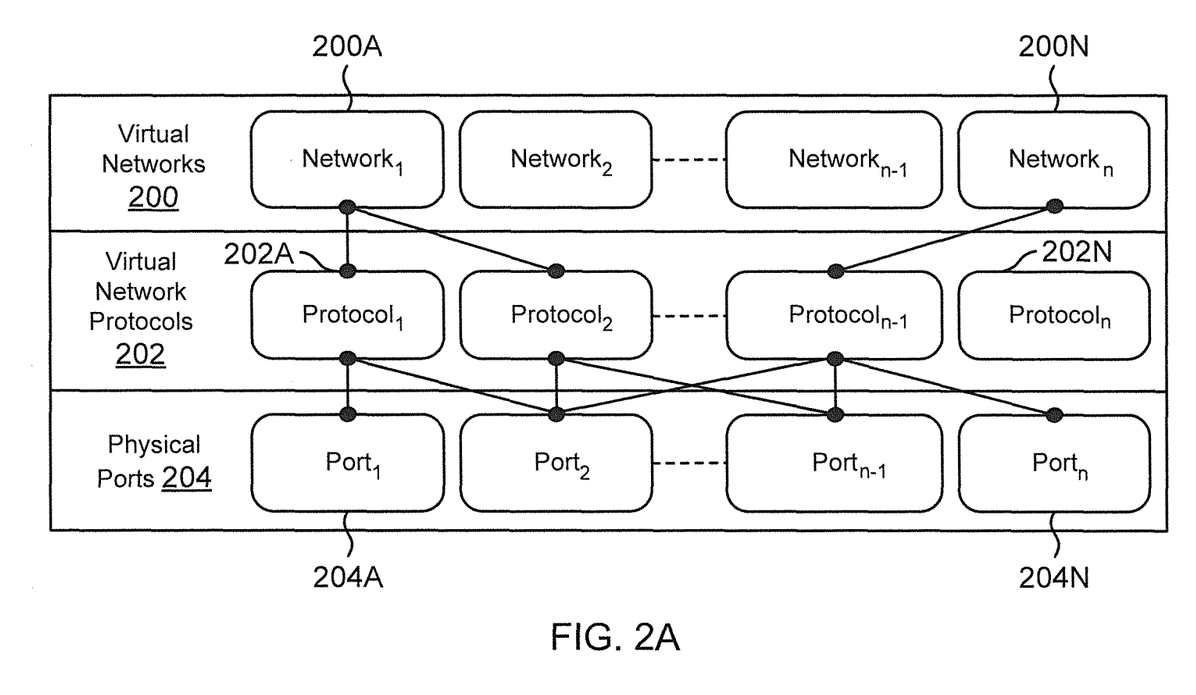
FIG. 2A shows an example of using various virtual networks, according to one embodiment.

FIG. 2A shows multiple virtual networks 200A-200N that may use a plurality of network protocols 202A-202N with physical switch ports 204A-204N. The different networks are configured by users to operate using different protocols but may use the same switch 118.

In a conventional networking environment, a user has to perform multiple manual tasks to provision and configure such network elements. Since physical and logical elements may be shared among various networks, a user may have to perform tedious tasks to map physical and logical components. This is time consuming and inefficient. The embodiments described herein use the management data structure 103A to maintain a hierarchical system for various networking components, making it easier to configure and validate a plurality of networking elements.

Figure 2B:
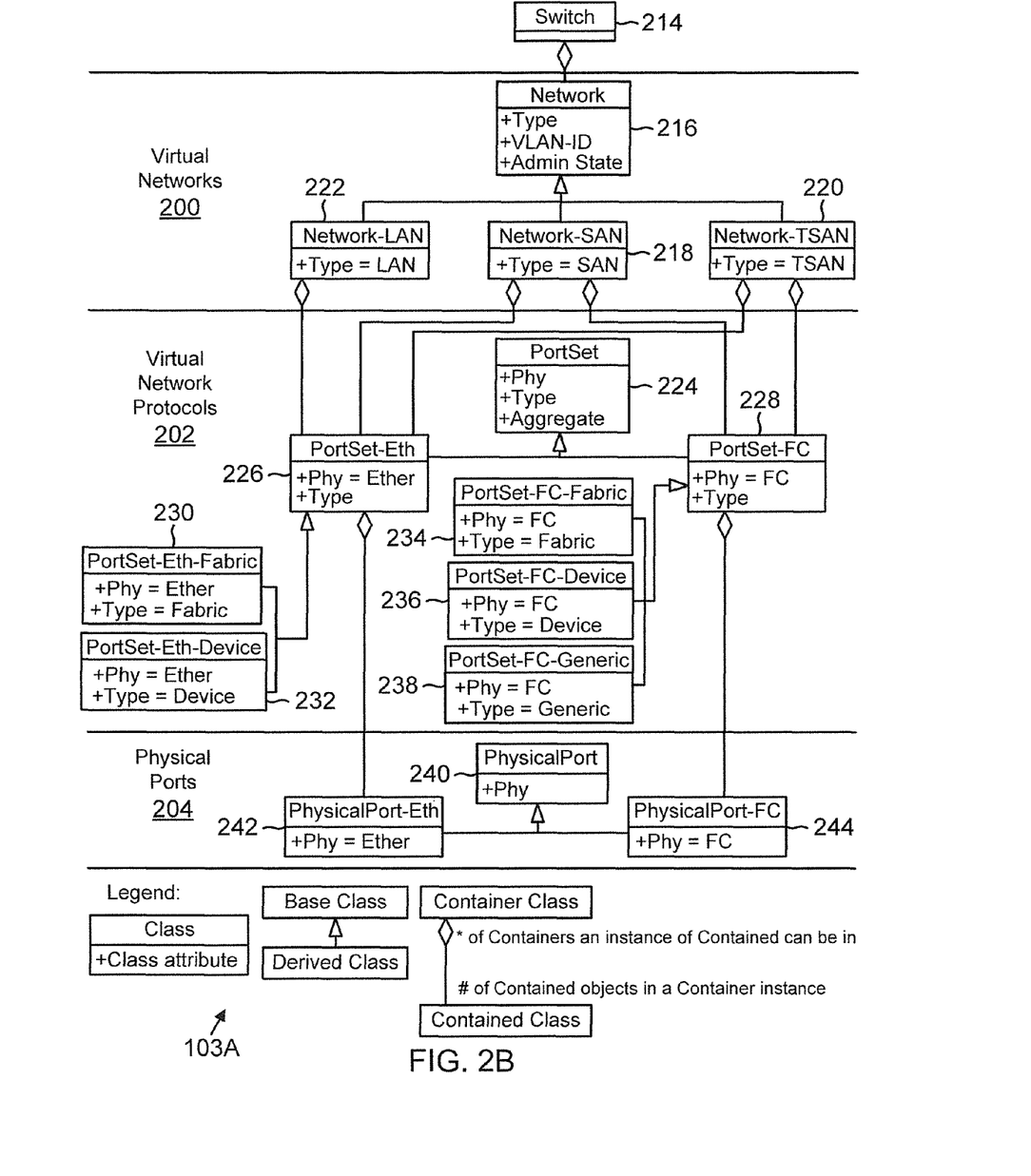
FIG. 2B shows an example of a management data structure used according to one embodiment.

FIG. 2B shows an example of management data structure 103A, according to one embodiment. In one embodiment, data structure 103A may be based on a unified management language (UML) model to store information related to different components as management objects in a hierarchical structure. Each object has a class and each class has attributes. A derived class of objects depends on a "base class." The legend for a container class and a contained class is also shown in FIG. 2B.

Switch 118 may be represented as a base class by switch object 214 that is referenced by a contained network object 216. The network object 216 as a base class is referenced by different virtual network type objects, for example, a LAN object 222, a SAN object 218, and a transparent SAN object 220. A transparent SAN is a mode of operation where switch 118 is used to provide a flexible mapping of a set of Adapter ports to a set of Fabric ports. This mapping is performed by using Virtualized N_Port Id (NPIV) technique provided by the Fibre Channel standards. This mapping is performed in a manner that is transparent to both the Adapters and the Fabric ports, hence the name Transparent SAN, or TSAN.

Below the network objects in FIG. 2B are a plurality of objects that define the various protocols that are used by the networks. A PortSet object 224 defines a cluster of ports that are used by switch 118. Below object 224 are contained class objects that define the protocols used by the networks. For example, object 226 indicates that the port is using Ethernet, while object 228 indicates that the port is using Fibre Channel. Object 226 is linked to derived class objects 230 and 232. Object 230 is used to define an Ethernet fabric and object 232 defines an Ethernet device. Object 228 is linked to derived class objects 234, 236 and 238. Object 234 defines a Fibre Channel Fabric, object 236 defines the Fibre Channel device and object 238 is used to define a default Fibre Channel device.

The physical ports are defined by object 240 and derived class objects 242 and 244. Object 242 defines a physical Ethernet port, while object 244 defines the Fibre Channel port.

As shown in FIG. 2B, object 242 is linked to contained class object 226. Derived class objects 230 and 232 are also linked to object 242. Object 226 is then linked to objects 222, 218 and 220. Object 244 is linked to object 228 that is also linked to objects 234, 236 and 238. Object 228 is then linked to objects 218 and 220.

Figure 2C:
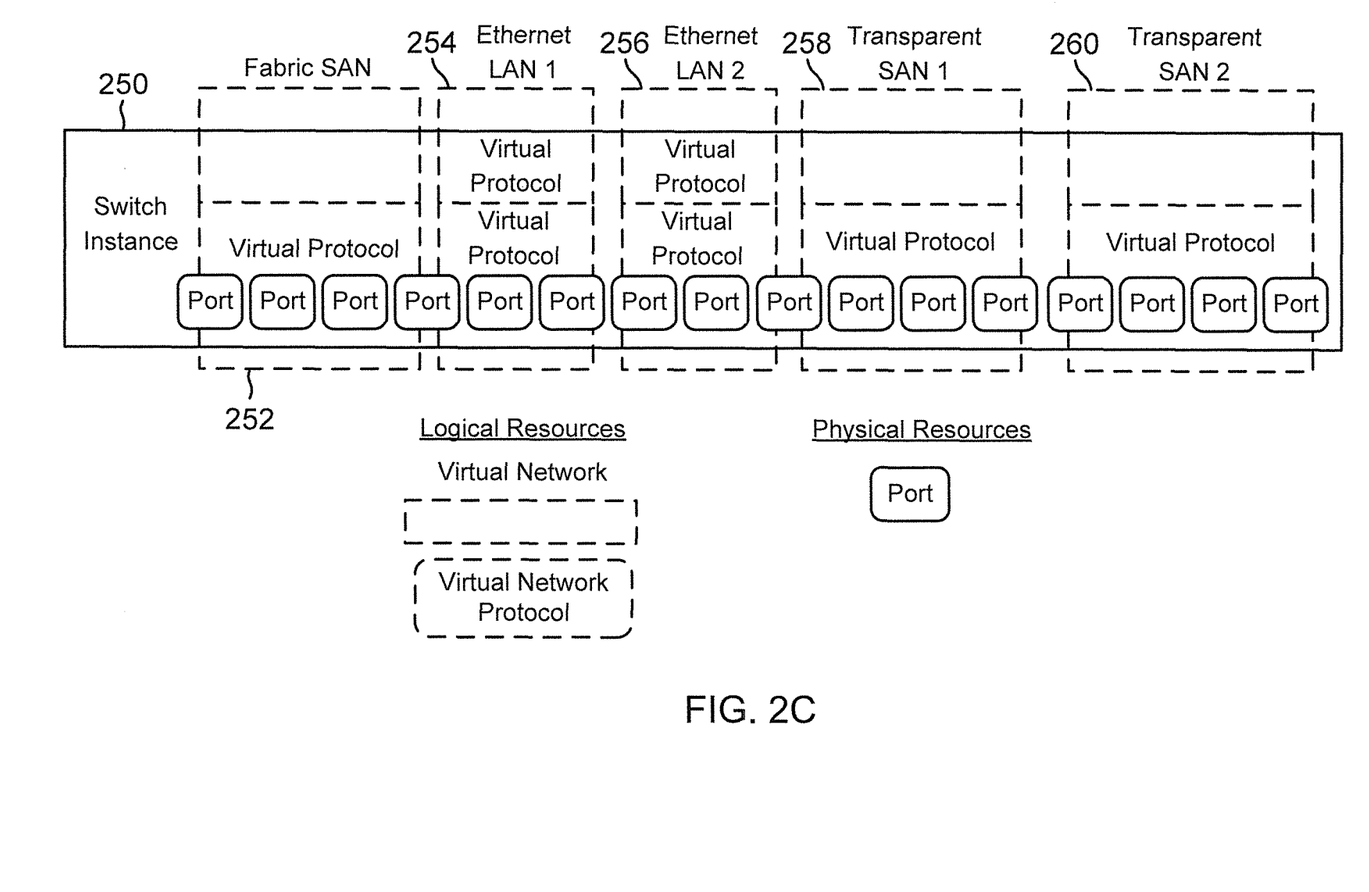
FIG. 2C shows an example of various virtual networks, according to one embodiment.

FIG. 2C shows an example of representing a switch instance using the data structure 103A of FIG. 2B. The switch instance 250 may be represented by object 214 which includes various other contained, base and device classes. For example, a fabric SAN 252 is represented by object 218, two Ethernet LANs 254 and 256 may be represented by objects similar to 222, while transparent SANs 258 and 260 are represented by object(s) 220. The virtual network protocols and the ports are represented by objects 226 and 228, and 242 and 244, respectively.

In one embodiment, maintaining data structure 103A allows a user to configure a switch instance in a plurality of virtual networks where the virtual networks using certain physical ports are configured to operate using more than one network protocol. The process for using data structure 103A is described below with respect to FIGS. 3A-3F.

Figure 3A:
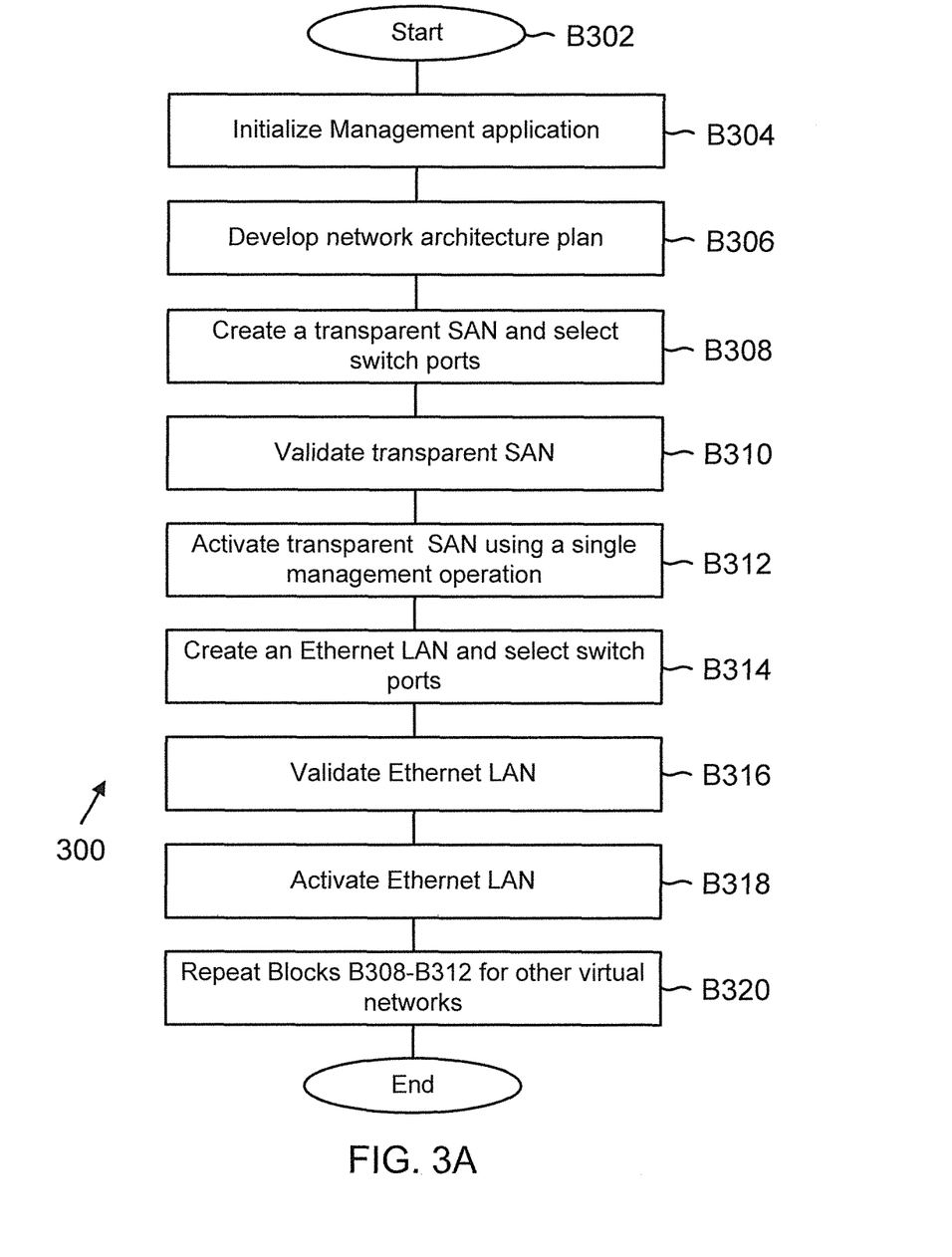
FIG. 3A shows a process flow diagram, according to one embodiment.

FIG. 3A shows process 300 for configuring a switch instance, according to one embodiment. The process begins in block B302, when a computing system, for example, management console 102C, is initialized and operational. Switch 118 is also operational and initialized.

In block B304, management application 103 is initialized and made available to a user. Management application 103 may provide a command line interface (CLI) or a graphical user interface (GUI). Management application 103 maintains the data structure 103A described above in detail with respect to FIG. 2B.

In block B306, the user develops a network plan. The network plan may include more than one virtual network with more than one protocol, for example, Ethernet, Fibre Channel, FCoE and others. The different network types include an Ethernet based LAN, a Fibre Channel based SAN, a transparent SAN and others. An example of the network plan is shown as 322 in FIG. 3B.

Figure 3B:
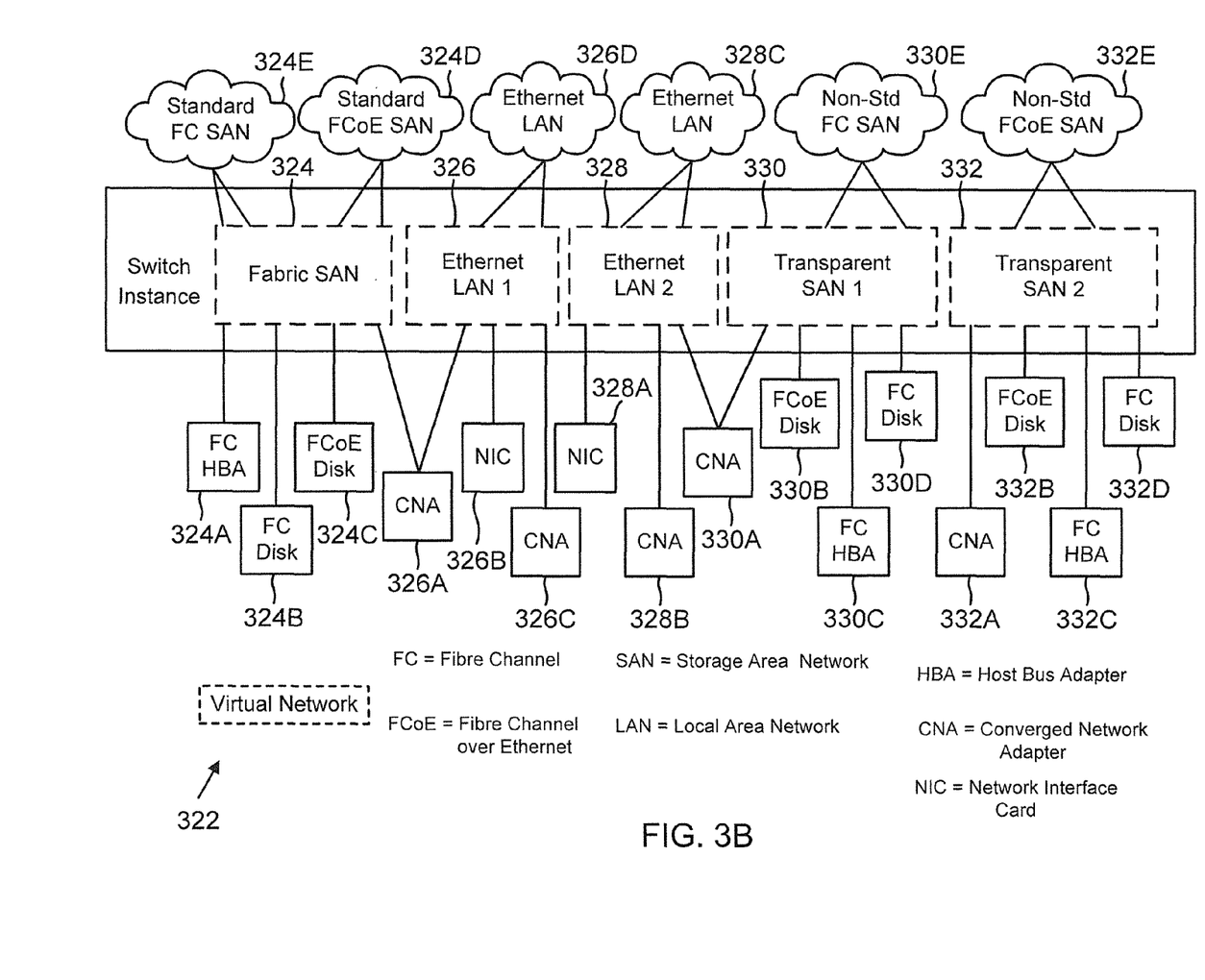
FIGS. 3B-3F show examples of using the process blocks of FIG. 3A, according to one embodiment.

The network plan includes a Fabric SAN 324 that is connected to Fibre Channel host bus adapter (HBA) 324A, a Fibre Channel storage device 324B, a FCoE device 324C, and a converged network adapter (CNA) 326A on one side of the switch instance and to a FC SAN 324E and FCoE SAN 324D on the other side.

Network plan 322 may also include Ethernet LANs 326 and 328. Ethernet LAN 326 is coupled to CNA 326A, a network interface card (NIC) 326B, CNA 326C, and Ethernet LAN 326D. Ethernet LAN 328 is coupled to NIC 328A, CNA 328B, CNA 330B, and Ethernet LAN 328C.

Network plan 322 may also include transparent SANs 330 and 332, respectively. Transparent SAN 330 is coupled to CNA 330A, FCoE disk 330B, FC HBA 330C, FC storage 330D, and non-standard FC SAN 330E. Transparent SAN 332 is coupled to CNA 332A, FCoE disk 332B, FC HBA 332C, FC storage 332D, and non-standard FC SAN 332E.

The example of FIG. 3B is to be taken as an illustration of the adaptive embodiments of the present disclosure. The embodiments are not limited to plan 322, for example, a network plan may include fewer or more virtual network types.

Figure 3C:
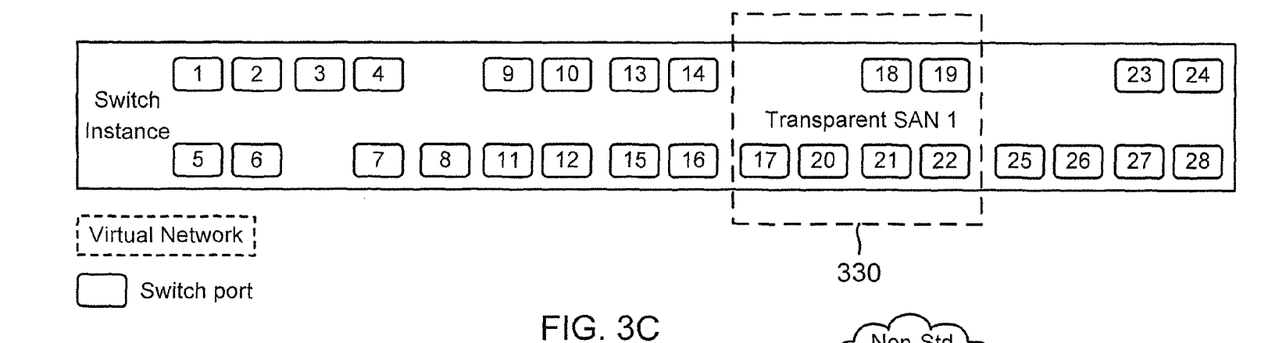

In block B308, the user first creates a transparent SAN, for example, 330 (FIG. 3C). The appropriate switch ports are selected for SAN 330, for example, switch ports 17, 20, 21 and 22 are used to couple to CNA 330A, FCoE disk 330B, FC HBA 330C, and FC disk 330D, respectively. Ports 18 and 19 are used to connect to non-standard FC SAN 330E.

In block B310, transparent SAN 330 is validated automatically with the network type, protocol attributes, availability of logical and physical resources, and consistency with any shared resources, for example, CNA 330A. Block B310 is executed using data structure 103A where all the information regarding physical and logical resources is stored in a hierarchical structure.

Figure 3D:
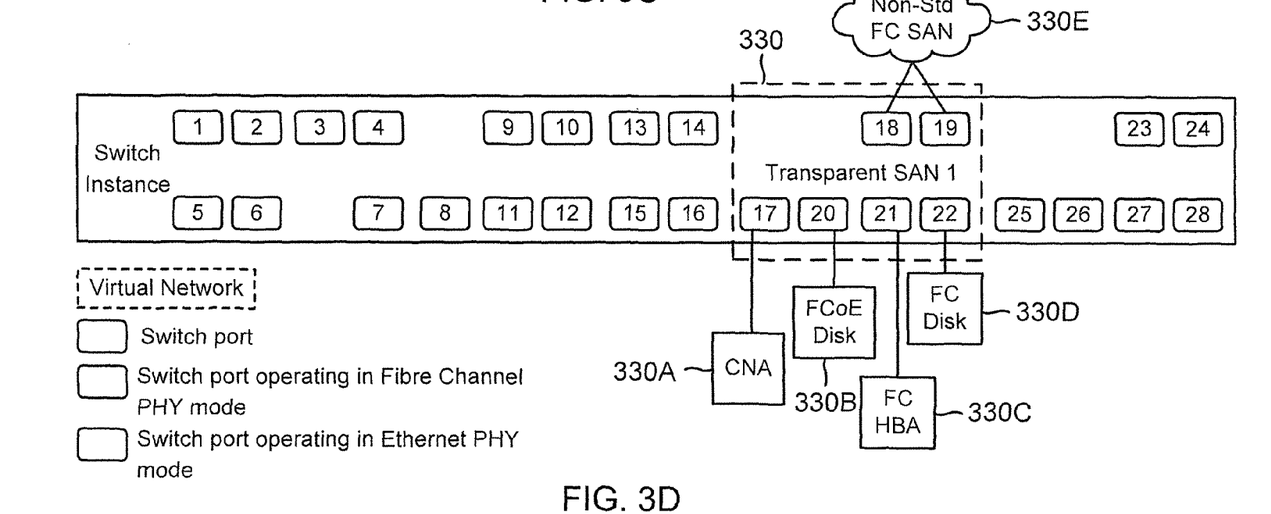

In block B312, the transparent SAN 330 is activated using a single management operation. Using data structure 103A, the virtual network protocols are initialized and the physical ports are configured to the correct operating mode. This is shown in FIG. 3D where ports 17 and 20 operate in Ethernet PHY mode for handling network traffic, while ports 18, 19, 21 and 22 operate in FC PHY mode for handling Fibre Channel based storage traffic.

Figure 3E:
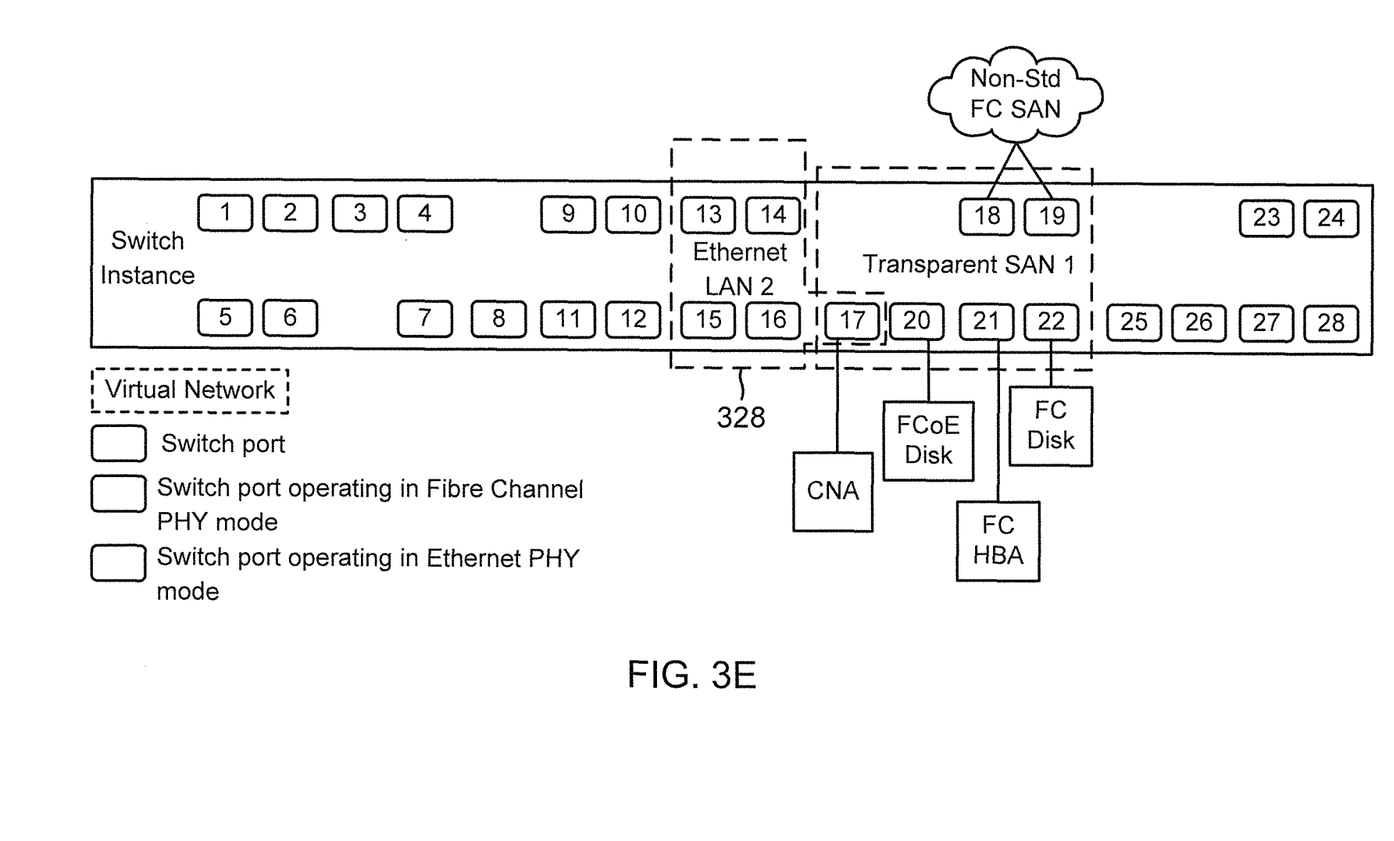
Figure 3F:
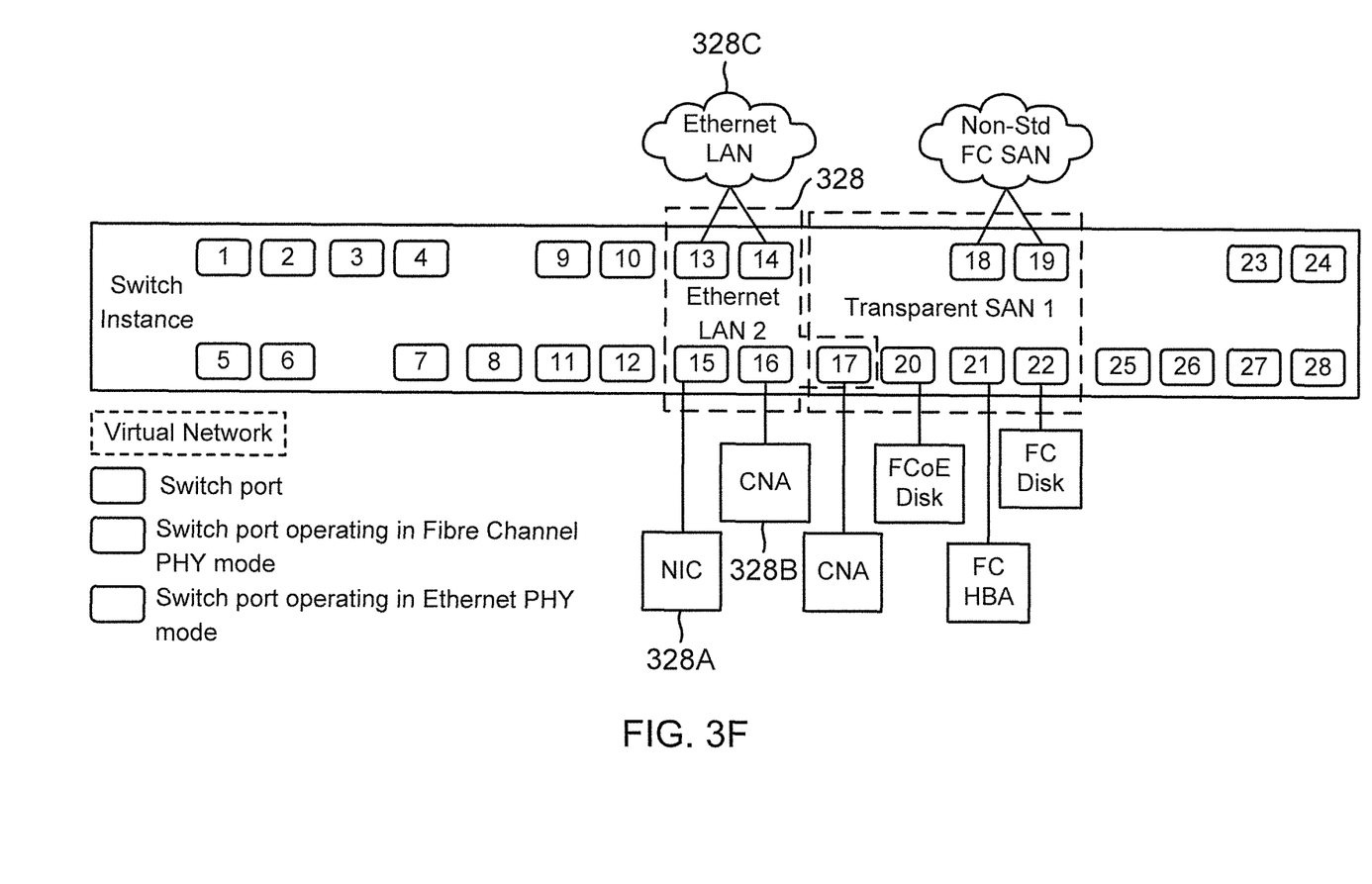

Blocks B314-318 are similar to blocks B308-B312 and are used to create, validate and activate the Ethernet LAN 328 using ports 13, 14, 15, and 16, as shown in FIG. 3E. Port 15 is coupled to NIC 328A, while port 16 is coupled to CNA 328B. Ports 13 and 14 are coupled to Ethernet LAN 328C as shown in FIG. 3F.

In block B320, the various blocks B308 and B312 are repeated to create virtual networks 324, 326 and 332 for network plan 322. The process then ends and the switch instance having a plurality of ports is configured to operate within a plurality of virtual networks using a plurality of protocols.

Thus, in one embodiment, a unified approach is provided to create, provision, and deploy a plurality of virtual SAN and LAN networks on a single switch element instance. The system and methods allow a user to use multiple network types using the same switching hardware. This simplifies management of concurrent virtual networks by an end-user.

In one embodiment, a user is able to plan and design virtual networks using a single management application 103. The user can define and provision logical resources, for example, protocol types and attributes, and physical resources, for example, switch ports.

In another embodiment, after creating a virtual network, all the physical and logical resources are validated using data structure 103A. A single management operation is used to execute one or more virtual networks.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine-implemented method for configuring a plurality of 5 virtual networks using a plurality of physical resources of a network device, comprising:
   generating, by a processor, a hierarchical data structure having a plurality of layers for representing an instance of the network device;
   wherein a first layer from among the plurality of layers includes a base network object to represent a network, the base network object referenced by a first set of objects that represent the plurality of virtual networks using a plurality of network protocols, where the first set of objects includes a local area network (LAN) object and a storage area network (SAN) object;
   wherein a second layer from among the plurality of layers includes a port set object that defines a cluster of ports used by the network device and a second set of objects that reference the port set object and represent a plurality of virtual network protocols that are used by the plurality of virtual networks, and
   wherein a third layer from among the plurality of layers include a third set of object to represent the plurality of physical resources that are used by the plurality of virtual networks for communicating with other devices;
   using a processor-executable management application for configuring the plurality of virtual networks and selecting physical resources for the plurality of networks; and
   validating the plurality of virtual networks by using the data structure to check if there is any conflict in using the selected physical resources.

2. The method of claim 1, wherein one of the virtual networks is an Ethernet based local area network.

3. The method of claim 1, wherein one of the virtual networks is a Fibre Channel based storage area network.

4. The method of claim 1, wherein one of the virtual networks is a Fibre Channel over Ethernet based storage area network.

5. The method of claim 1, wherein Ethernet is one of the protocols used by a virtual network.

6. The method of claim 1, wherein Fibre Channel is one of the protocols used by a virtual network.

7. The method of claim 1, wherein Fibre Channel over Ethernet is one of the protocols used by a virtual network.

8. A system comprising:
   a network device configured to support a plurality of virtual networks using a plurality of physical resources and coupled to a plurality of devices; and
   a management console configured to receive information regarding the network device for managing the network device; wherein for managing the network device, the management console maintains a hierarchical data structure having a plurality of layers for representing an instance of the network device, wherein a first layer from among the plurality of layers includes a base network object to represent a network, the base network object referenced by a first set of objects that represent the plurality of virtual networks using a plurality of network protocols, where the first set of objects includes a local area network (LAN) object and a storage area network (SAN) object;

wherein a second layer from among the plurality of layers includes a port set object that defines a cluster of ports used by the network device and a second set of objects that reference the port set object and represent a plurality of virtual network protocols that are used by the plurality of virtual networks, and wherein a third layer from among the plurality of layers include a third set of object to represent the plurality of physical resources that are used by the plurality of virtual networks for communicating with other devices; and wherein the management console executes a processor executable management application for configuring the plurality of virtual networks and selecting physical resources for the plurality of networks; and validating the plurality of virtual networks by using the data structure to check if there is any conflict in using the selected physical resources.

9. The system of claim 8, wherein one of the virtual networks is an Ethernet based local area network.

10. The system of claim 8, wherein one of the virtual networks is a Fibre Channel based storage area network.

11. The system of claim 8, wherein one of the virtual networks is a Fibre Channel over Ethernet based storage area network.

12. The system of claim 8, wherein Ethernet is one of the protocols used by a virtual network.

13. The system of claim 8, wherein Fibre Channel is one of the protocols used by a virtual network.

14. The system of claim 8, wherein Fibre Channel over Ethernet is one of the protocols used by a virtual network.

15. A machine-implemented method, comprising:

configuring, by a processor, a network device coupled to a plurality of other devices to operate using a plurality of virtual networks using a plurality of physical resources of the network device;

maintaining a hierarchical data structure having a plurality of layers for representing an instance of the network device; wherein a first layer from among the plurality of layers includes a base network object to represent a network, the base network object referenced by a first set of objects that represent the plurality of virtual networks using a plurality of network protocols, where the first set of objects includes a local area network (LAN) object and a storage area network (SAN) object;

wherein a second layer from among the plurality of layers includes a port set object that defines a cluster of ports used by the network device and a second set of objects that reference the port set object and represent a plurality of virtual network protocols that are used by the plurality of virtual networks, and wherein a third layer from among the plurality of layers include a third set of object to represent the plurality of physical resources that are used by the plurality of virtual networks for communicating with other devices; and validating the plurality of virtual networks by using the data structure to check if there is any conflict in using the selected physical resources.

16. The method of claim 15, wherein one of the virtual networks is an Ethernet based local area network.

17. The method of claim 15, wherein one of the virtual networks is a Fibre Channel based storage area network.

18. The method of claim 15, wherein one of the virtual networks is a Fibre Channel over Ethernet based storage area network.

19. The method of claim 15, wherein Ethernet is one of the protocols used by a virtual network.

20. The method of claim 15, wherein Fibre Channel is one of the protocols used by a virtual network.

21. The method of claim 15, wherein Fibre Channel over Ethernet is one of the protocols used by a virtual network.

* * * * *